United States Patent
Wang et al.

(10) Patent No.: US 8,966,106 B2
(45) Date of Patent: *Feb. 24, 2015

(54) SYSTEM AND METHOD FOR MEDIA CONTENT STREAMING

(71) Applicant: FutureWei Technologies, Inc., Plano, TX (US)

(72) Inventors: Ye-Kui Wang, Bridgewater, NJ (US); Hongbing Li, Sillman, NJ (US); Tingfang Tang, Beijing (CN); Yuejing Yin, Beijing (CN)

(73) Assignee: FutureWei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,207

(22) Filed: Jan. 27, 2014

(65) Prior Publication Data

US 2014/0164575 A1     Jun. 12, 2014

Related U.S. Application Data

(63) Continuation of application No. 12/939,941, filed on Nov. 4, 2010, now Pat. No. 8,677,005.

(60) Provisional application No. 61/258,162, filed on Nov. 4, 2009.

(51) Int. Cl.
*G06F 15/16*     (2006.01)
*H04L 29/06*     (2006.01)
(Continued)

(52) U.S. Cl.
CPC .......... *H04L 65/60* (2013.01); *H04N 21/23439* (2013.01); *H04N 21/6587* (2013.01); *H04N 21/8456* (2013.01); *H04L 65/608* (2013.01); *H04L 65/80* (2013.01); *H04L 67/02* (2013.01)
USPC .......................................... 709/231; 709/219

(58) Field of Classification Search
USPC .................................................. 709/231, 219
See application file for complete search history.

(56) References Cited

U.S. PATENT DOCUMENTS

2002/0103920 A1   8/2002   Berkun et al.
2003/0115282 A1   6/2003   Rose
(Continued)

FOREIGN PATENT DOCUMENTS

EP      1531601 A1       5/2005
WO      2009020552 A1    2/2009

OTHER PUBLICATIONS

Zambelli, Alex, "IIS Smooth Streaming Technical Overview," Retrieved from Internet, http://img.prodek.It/documents/ [] I IS_Smooth_Streaming_Technical_Overview.pdf, dated Mar. 2009, 17 pages.*

(Continued)

*Primary Examiner* — Michael Thier
*Assistant Examiner* — Brian Cox
(74) *Attorney, Agent, or Firm* — Slater & Matsil, L.L.P.

(57) ABSTRACT

In accordance with an embodiment, a method includes electronically receiving a media presentation description (MPD) from a network. The MPD describes multimedia content that includes alternative representations of a plurality of media types, and the MPD includes information indicative of how the alternative representations are encoded. The method also includes selecting one of the plurality of alternative representations for at least one of the plurality of media types based on information included in the MPD, requesting the selected one of the plurality of alternative representations piece-by-piece, and electronically receiving a piece of media data.

20 Claims, 2 Drawing Sheets

(51) Int. Cl.
*H04N 21/2343* (2011.01)
*H04N 21/6587* (2011.01)
*H04N 21/845* (2011.01)
*H04L 29/08* (2006.01)

(56) References Cited

U.S. PATENT DOCUMENTS

| | | |
|---|---|---|
| 2003/0135633 A1 | 7/2003 | Dror et al. |
| 2005/0089035 A1 | 4/2005 | Klemets et al. |
| 2005/0254526 A1 | 11/2005 | Wang et al. |
| 2006/0037057 A1 | 2/2006 | Xu |
| 2007/0002851 A1 | 1/2007 | Paila et al. |
| 2007/0162568 A1 | 7/2007 | Gupta et al. |
| 2007/0292108 A1 | 12/2007 | Reichert et al. |
| 2008/0151885 A1 | 6/2008 | Horn et al. |
| 2011/0196982 A1 | 8/2011 | Chen et al. |

OTHER PUBLICATIONS

"Pseudo CR: Multimedia Presentation Description for Adaptive HTTP Streaming," 3GPP TSG-AHI Meeting #nn, S4-AHI124, Dec. 13-15, 2009, 9 pages, Paris, France.
Chinese Office Action received in Chinese Application No. 201080027024.6, dated Feb. 5, 2013, 11 pages.
International Search Report, PCT/US2010/055506, mailed Jan. 13, 2011, 2 pages.
"IIS Smooth Streaming Transport Protocol," Microsoft Corporation, Retrieved from Internet, http://www.iis.net/community/files/media/smoothspecs/%5BMS-SMTH%5D.pdf, dated Sep. 8, 2009, 55 pages.
Pantos, R., "HTTP Live Streaming," Apple, Inc., Informational Internet Draft, Oct. 5, 2009, 21 pages.
Notification Concerning Transmittal of International Preliminary Report on Patentability, International Preliminary Report on Patentability, Huawei Technologies Co., Ltd., et al., PCT/US2010/055506, mailed May 18, 2012; 7 pages.
Qualcomm Europe S.A.R.L., et al., "Pseudo CR: Adaptive HTTP Streaming in PSS-Data Formats for HTTP-Streaming excluding MPD," 3GPP TSG-AHI Meeting #nn, S4-AHI128, Dec. 13-15, 2009, 7 pages, Paris, France.
Qualcomm Europe S.A.R.L., et al., "Pseudo CF: Adaptive HTTP Streaming in PSS-Client Behaviour," 3GPP TSG-AHI Meeting #nn, S4-AHI129, Dec. 13-15, 2009, 3 pages, Paris, France.
Qualcomm Europe S.A.R.L., et al., "Adaptive HTTP Streaming in PSS-Discussion on Options," 3GPP TSG-SA4 AHI Meeting, S4-AHI130, Dec. 14-16, 2009, 7 pages, Paris France.
Stockhammer, T., "PSS and MBMS Extensions", permanent document S4-AHI094, 3GPP TSG-SA WG4 MBS and Video Adhoc Meeting, Sep. 28-Oct. 1, 2009, V.0.0.4, Seattle WA., pp. 1-11.
Supplementary European Search Report and European Search Opinion received in European Patent Application No. 10829116.2, dated Dec. 5, 2012, 9 pages.
Written Opinion of the International Search Authority received in Patent Cooperation Treaty Application No. PCT/US10/55506, dated Jan. 13, 2011, 4 pages.
Zambelli, Alex, "IIS Smooth Streaming Technical Overview," Retrieved from Internet, http://img.prodek.It/documents/IIS_Smooth_Streaming_Technical_Overview.pdf, dated Mar. 2009, 17 pages.
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP TS 26.247 V10.0.0, Jun. 2011, 94 pages.

\* cited by examiner

SYSTEM AND METHOD FOR MEDIA CONTENT STREAMING

CROSS REFERENCE TO RELATED APPLICATIONS

This patent application is a continuation of U.S. Non-Provisional application Ser. No. 12/939,941 filed on Nov. 4, 2010, entitled "System and Method for Media Content Streaming," which claims priority to U.S. Provisional Application No. 61/258,162 filed on Nov. 4, 2009, entitled "HTTP Streaming," both of which applications are hereby incorporated by reference herein in their entireties.

TECHNICAL FIELD

The present invention relates generally to communication systems, and more particularly to a system and method for Media Content Streaming.

BACKGROUND

As the capability of IP networks and network infrastructure has increased, and the quality of Internet-based video streaming technology has improved, the popularity of Internet streaming for video distribution has increased tremendously. One common method of implementing streaming video is transmitting the video program from a Hypertext Transfer Protocol (HTTP) server to a web-based HTTP client. Web-based streaming video is pervasive because of the simplicity of access, in that a user simply clicks on a link to view video content.

Video streaming technology faces some difficulties, however. In some cases, when a user requests video content, there can be a considerable delay before the content starts playing. In some cases, streaming video content is interrupted or stalled because of heavy network and/or poor link conditions. In other cases, even if the network link initially starts out good, the viewing experience may be later degraded due to changing network conditions.

SUMMARY OF THE INVENTION

In accordance with an embodiment, a method includes electronically receiving a media presentation description (MPD) from a network. The MPD describes multimedia content that includes alternative representations of a plurality of media types, and the MPD includes information indicative of how the alternative representations are encoded. The method also includes selecting one of the plurality of alternative representations for at least one of the plurality of media types based on information included in the MPD, requesting the selected one of the plurality of alternative representations piece-by-piece, and electronically receiving a piece of media data.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, a system and method for media content streaming. In particular, some embodiments relate to streaming of media content based on the HTTP protocol.

Figure 1:
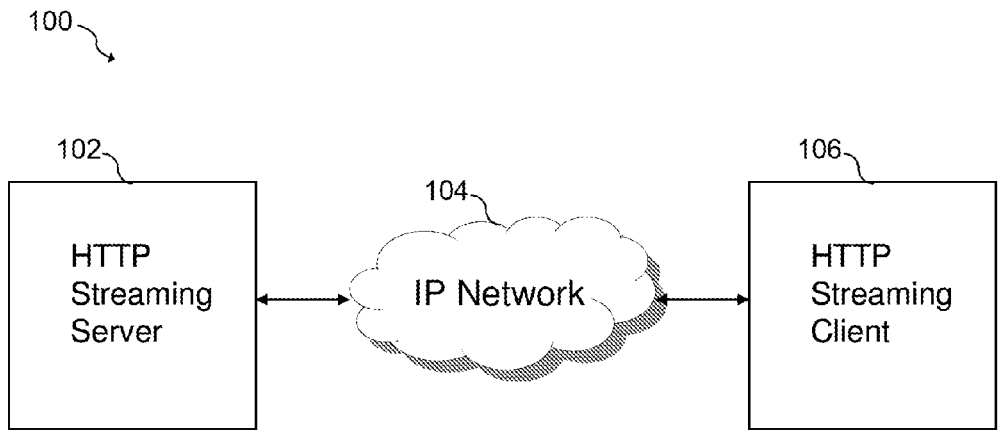
FIG. 1 illustrates a media streaming system.

FIG. 1 illustrates HTTP-based media content streaming system 100 that implements concepts and methods of the present invention. System 100 has HTTP streaming server 102 that transmits streaming media to HTTP streaming client 106 via IP network 104. It should be appreciated that alternative embodiments can also be directed toward other streaming systems besides HTTP streaming systems.

Figure 2:
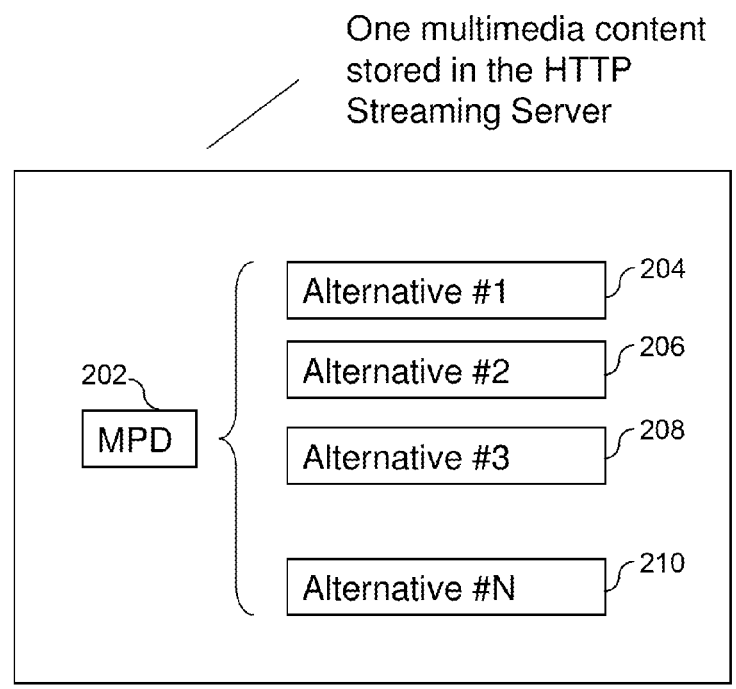
FIG. 2 illustrates an embodiment data structure.

Embodiments of the present invention utilize systems and methods for HTTP streaming of multimedia streams of audio and/or video and/or other media types. These systems and methods offer flexible and efficient support of on-demand and live streaming based on a storage method, a media presentation description (MPD), and use of HTTP GET requests with or without byte ranges. In the MPD, the byte range and time range of a media segment may be included, such that clients can efficiently request media segments using byte ranges only. The MPD may include additional codec information for a media alternative representation for support of media contents encoded with more than one encoding configuration. For example MPD 202 in FIG. 2 points to alternative representations 204, 206, 208 and 210. Each of these alternative representations can encompass a single file or multiple files of media content data, wherein each file is associated with a unique uniform resource locator (URL).

A maximum length of all segments can be included in the MPD to enable use of byte range without signaling of byte ranges in the MPD and a greatly reduced size of MPD, which implies low startup delay for the streaming process. To indicate the end of a live streaming session, the server can compose the next expected file or segment in an abnormal way, e.g. making the file or segment empty. To enable tuning into a live streaming session and start to request the latest content, a special file name and consequently a special URL is used for the file containing the latest segment available in the streaming server. To enable a client figure out which file to start with when it wants to seek to a specific temporal position while segment duration is constant and there are no byte offsets and no time offsets signaled for each segment in the MPD, the URL of a file can be formed to be capable of indicating the starting playback time of the file. Efficient streaming processes that enable normal streaming processes like setup, pause, resume, and stop, as well as seeking, fast forward, fast rewind and stream adaption processes are provided.

Figure 3:
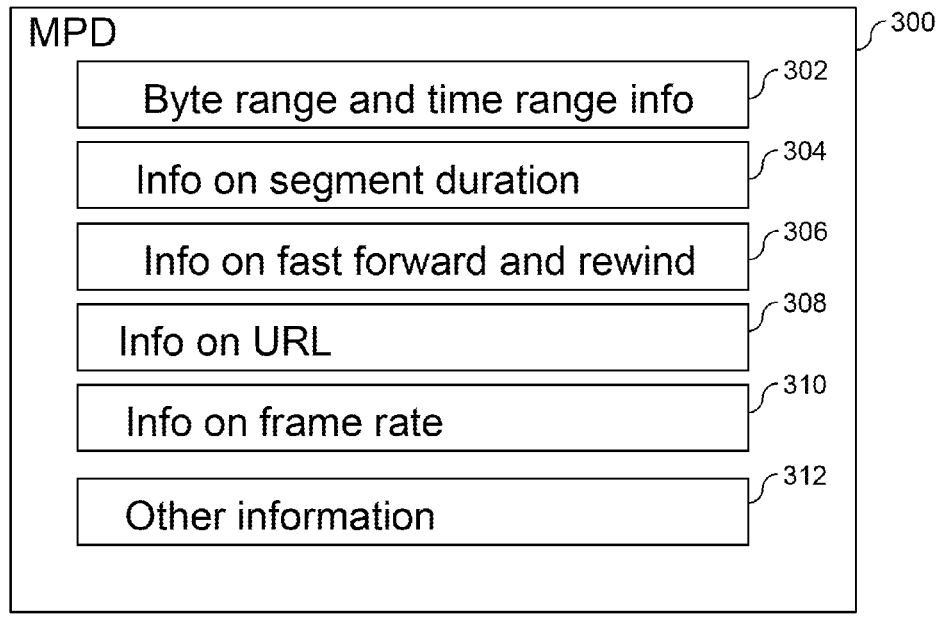
FIG. 3 illustrates an embodiment media presentation description (MPD) structure.

FIG. 3 illustrates MPD structure 300 according to one embodiment of the present invention. MPD 300 has byte range and time range information 302, segment duration information 304, fast forward and rewind information 306, URL information 308, and frame rate information 310. In some embodiments, other information 312 can be included. In alternative embodiments, a subset of the MPD structure 300 can be used.

Figure 4:
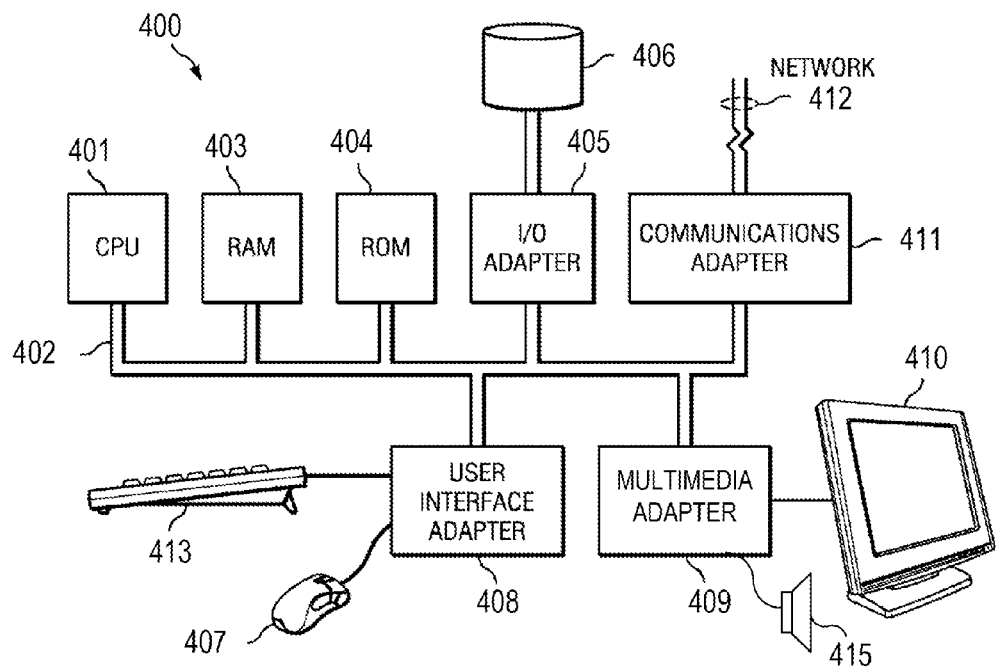
FIG. 4 illustrates a computer system for implementing embodiment methods.

FIG. 4 illustrates computer system 400 adapted to use embodiments of the present invention, e.g., storing and/or executing software associated with the embodiments. Central processing unit (CPU) 401 is coupled to system bus 402. CPU 401 may be any general purpose CPU. However, embodiments of the present invention are not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) adapter 405, communications adapter 411, user interface 408, and multimedia adaptor 409. The I/O adapter 405 connects storage devices 406, such as one or more of a hard drive, a CD drive, a floppy disk drive, a tape drive, to computer system 400. The I/O adapter 405 is also connected to a printer (not shown), which would allow the system to print paper copies of information such as documents, photographs, articles, and the like. Note that the printer may be a printer, e.g., dot matrix, laser, and the like, a fax machine, scanner, or a copier machine. User interface adaptor is coupled to keyboard 413 and mouse 407, as well as other devices. Multimedia adapter 409, which can be a display and/or audio card in some embodiments, is connected to display device 410 and audio device 415. Display device 410 can be a CRT, flat panel display, or other type of display device, and audio device 415 can be a loudspeaker, headphones, or other analog or digital audio system.

In some embodiments, HTTP streaming refers to streaming of multimedia contents based on the HTTP protocol. 3GPP supports streaming delivery since Release 4 of its specifications. 3GPP TS 26.234 specifies streaming delivery based on RTSP and RTP over UDP. HTTP streaming is spreading widely as the form of delivery of Internet video, and there is a trend towards using HTTP as the main protocol for multimedia delivery. In alternative embodiments, other streaming systems and standards can be used.

Technical reasons for the popularity of HTTP streaming include the ability to use standard servers and standard HTTP caches (or cheap servers in general) to deliver the content, so that it can be delivered from a CDN or any other standard server farm, the ability to move control of "streaming session" entirely to the client, which basically only opens one or several TCP connections to one or several standard HTTP servers or caches HTTP steaming is also popular because it enables easy and effortless streaming services by avoiding NAT and firewall traversal issues.

One approach for HTTP streaming is referred to as the static content serving mode. In this mode, the standard HTTP Server is used without any extension. Content is offered as a file or a collection of files that are available on an HTTP server. The client acquires the content by accessing the files using HTTP GET request with or without byte ranges.

At least the following problems are unsolved from existing solutions for HTTP streaming based on the above approach. First, using time ranges in HTTP GET requests is convenient for a client to request media data from a streaming server. However, existing standard HTTP servers understand byte ranges but do not understand time ranges.

Second, there lacks a way to signal in an MPD the information of more than one encoding configuration for a media alternative representation. Third, to enable low startup delay, it is preferable to have a small-sized MPD. Thus, in some cases, it would be desirable not to have file or media segment specific information in the MPD, as a presentation may be split into a large number of files in the time dimension. However, there lacks a way to enable the client meaningfully request media segments without file or media segment specific information in the MPD, such as time ranges and/or byte ranges.

Fourth, when a live streaming session is ended, the server should inform the clients such that they don't continue trying and failing, which causes annoying user experiences. One way to notify this to clients is to use a timely updated MPD. However, this requires that the MPD update be timely received by the client, which consumes additional resources on the client, which is burdensome when using a static MPD is desired and possible.

Fifth, when tuning to a live streaming, a client would typically like to start receiving the latest content. One way to do this is to tell information of the URL and/or byte range of the latest media segment through a timely updated MPD. However, this requires that the MPD update be timely received by the client, which consumes additional resources on the client, which is burdensome when using a static MPD is desired and possible.

Sixth, when segment duration is constant and there are no byte offsets and no time offsets signaled for each segment in the MPD, a client cannot figure out which file to start with when it wants to seek to a specific temporal position. Finally, there lacks a mechanism for support of fast forward and fast rewind in HTTP streaming.

To address the above problems, the following new features are among those provided by embodiments of the invention. First, in the MPD, the byte range and time range of a media segment may be included, such that clients can efficiently request media segments using byte ranges only. Second the MPD may include additional codec information for a media alternative representation for support of media contents encoded with more than one encoding configuration.

Third, a maximum length of all segments can be included in the MPD to enable use of byte range without signaling of byte ranges in the MPD and a greatly reduced size of MPD, which implies low startup delay for the streaming process. Fourth, to indicate the end of a live streaming session, the server can compose the next expected file or segment in an abnormal way, e.g. making the file or segment empty. Fifth, to enable tuning into a live streaming session and start to request the latest content, a special file name and consequently a special URL is used for the file containing the latest segment available in the streaming server.

Sixth, a URL prefix for an alternative representation is given. The URL of a file containing one or more segments of an alternative representation is the concatenation of the URL prefix for the alternative representation and the corresponding file index value, e.g. in the form of five decimal digits, e.g., 00000, 00005, 00012, and so on. For each alternative representation, the file index value for the first file (the one containing a 'moov' box) is equal to 0, and the file index value for other files is equal to the segment index value of the first segment contained in the file, which is equal to the sequence number field found in the movie fragment header box of the movie fragment corresponding to the first segment contained in the file. This way, when segment duration is constant and there are no byte offsets and no time offsets signaled for each segment in the MPD, a client can figure out which file to start with when it wants to seek to a specific temporal position.

Finally, efficient streaming processes that enable normal streaming processes like setup, pause, resume, and stop, as well as seeking, fast forward, fast rewind and stream adaption processes are provided.

Embodiments of the present invention incorporate an approach for the Static Content Serving Mode of HTTP Streaming, including file storage, media presentation description, and streaming processes for both on-demand streaming and live streaming.

Regarding file storage, the media presentation description (MPD) is stored in a separate file by its own in some embodiments. In one embodiment, media files are stored such that each file contains one or more segments of one alternative representation. For example, in some embodiments, a file may contain and only contain one or more segments of one audio alternative representation, a file may contain and only contain one or more segments of one video alternative representation, a file may contain and only contain one or more segments of one audio-video alternative representation consisting of one audio alternative representation and one video representation. However, in one embodiment, a file does contain one or more segments of more than one video alternative representation, and does not contain one or more segments of more than one audio alternative representation.

In an embodiment, the first segment of one alternative representation contains the 'ftyp' box and the 'moov' box, but does not contain a 'moof box. In the 'moov' box, in one embodiment, no media sample is documented, i.e., entry count in the each 'stts' box contained in the 'moov' box shall be equal to 0, and sample count in each 'stsz' or 'stz2' box contained in the 'moov' box shall be equal to 0. As there is no sample documented in the first segment, there does not need to be an associated 'mdat' box. In an embodiment, any other segment than the first segment contains exactly one movie fragment. Alternatively, more than one movie fragment can be used. Furthermore, for any other segment than the first segment, the metadata ('moof box etc.) and the media data ('mdat' box) shall be stored in the same file.

For some alternative representations, partitioning of media samples into segments is temporally aligned, such that the n-th segment of alternative representation A covers the same time period of any other alternative representation B. There may be an exception for fast forward and fast rewind alternative representations, for which one segment covers an integer number of segments in those alternative representations for normal playback.

An alternative to the above storage approach (referred to as storage approach 1) is to have one "giant" 'moov' box containing the first segments of alternative representations and this is stored in a separate file as its own, while other segments of alternative representations are stored as in the above storage approach. This alternative approach is referred to as storage approach 2. For both storage approaches 1 and 2, the MPD may also be included in the 'moov' box, or referenced by a URL included in the 'moov' box.

For live streaming, in addition to the above specifications, the following applies:

In one embodiment, when H.264/AVC video is in use, parameter sets is stored in a separate parameter set track instead of in the sample entries, as the video encoder may need to figure out optimal encoding parameters during encoding and therefore the parameter sets cannot be known and included when the 'moov' box is generated.

In an embodiment, an alternative way of storing the MPD is to store it as part of a media file. However, storing MPD as a separate file by its own makes it easier to access the MPD, in particular in on-demand case, as simply one HTTP GET request can be used to fetch the MPD. If it is stored as part of a media file, then to accurately request only the MPD, the exact location of the MPD in the file must be known by the client. One more advantage for storing MPD separately is that the process is much simpler for live streaming as the increasing of the MPD records will have no impact on the offset of the media part of the media file containing the MPD.

There are many alternative ways to store the media content excluding the MPD. For example, a first alternative way is to store all alternative representations in one file as typically in RTP/RTSP based streaming. A second alternative way is to store all the metadata ('moov' box and 'moor boxes etc.) in one file, and all the media data ('mdat' box or boxes) in other files, without splitting to multiple files in the temporal dimension (i.e. all segments of one alternative representation in one file). In some embodiments, these two storage methods may not be friendly to caching.

A third alternative way is similar to the second alternative, but with splitting to multiple files in the temporal dimension, e.g. each segment is stored in two separate files, one for the metadata ('moov' or 'moof box) and one for the media data ('mdat' box). A major disadvantage of this storage method compared to the proposed approach is that the number of files doubles, and consequently, the number of HTTP requests doubles for streaming of the same content.

A fourth alternative is to store one or more segments of each audio-video alternative in one file. A major disadvantage of this method is redundant storage. For example, when there are two audio alternative representations, then each video alternative representation is repeatedly stored twice.

For live streaming with H.264/AVC video, parameter sets may also be stored in the sample entries. However, this way disallows the video encoder to change to more optimal encoding parameters during encoding. Another alternative is to put new parameter sets in a new box contained in the 'moof box. In some regards, this way is not backward-compatible and existing H.264/AVC file readers will ignore the new box, wherein the new parameter sets are needed for correctly decoding the samples contained in the movie fragment.

An embodiment syntax and semantics for the MPD are as follows:

```
media_presentation_description( )
{
        // beginning of global information
        BOOL live_session;
        byte(4) major_brand;
        byte(4) timescale;
        byte(4) presentation_duration;
        BOOL constant_segment_duration;
        if(constant_segment_duration)
        byte(4) segment_duration;
        BOOL constant_num_segments_per_file;
        if(constant_num_segments_per_file)
        byte(4) num_segments_in_one_file;
        BOOL num_segments_aligned;
        BOOL byte_offset_included;
        BOOL codec_mime_type_included_for_each_file;
        byte(2) num_separate_audio_alternatives;
        byte(2) num_separate_video_alternatives;
        byte(2) num_av_combined_alternatives;
        byte(2) num_video_fastforward_alternatives;
        byte(2) num_video_rewind_alternatives;
        for (i=0; i<num_separate_audio_alternatives; i++){
                string codec_mime_type;
                byte(4) avg_bitrate;
                byte(2) language_code;
                byte(1) channel_count;
                string url_prefix;
                byte(4) max_segment_len_in_bytes;
        }
        for (i=0; i<num_separate_video_alternatives; i++){
                string codec_mime_type;
                byte(4) width;
                byte(4) height;
                byte(4) avg_framerate;
                byte(4) avg_bitrate;
                string url_prefix;
                byte(4) max_segment_len_in_bytes;
        }
        for (i=0; i<num_av_combined_alternatives; i++){
                string audio_codec_mime_type;
                byte(4) audio_avg_bitrate;
                byte(2) language_code;
                byte(1) channel_count;
                string video_codec_mime_type;
                byte(4) width;
                byte(4) height;
                byte(4) avg_framerate;
                byte(4) video_avg_bitrate;
                string url_prefix;
                byte(4) max_segment_len_in_bytes;
        }
        for (i=0; i<num_video_fastforward_alternatives; i++){
                string codec_mime_type;
                byte(4) width;
                byte(4) height;
                byte(4) avg_framerate;
                byte(4) avg_bitrate;
                string url_prefix;
        byte(4) max_segment_len_in_bytes;
        byte(1) num_segments_denominator_ff[i];
        }
        for (i=0; i<num_video_rewind_alternatives; i++){
                string codec_mime_type;
                byte(4) width;
                byte(4) height;
                byte(4) avg_framerate;
                byte(4) avg_bitrate;
                string url_prefix;
        byte(4) max_segment_len_in_bytes;
        byte(1) num_segments_denominator_rw[i];
        }
        // end of global information, start of segment specific
information
        // The following six fields are just variables,
        // and there are no bits used in the MPD for them
        file_index_a = 0;
        file_index_v = 0;
        file_index_av = 0;
        file_index_ff = 0;
        file_index_rw = 0;
        file_index = −1;
```

```
        while(!EoMPD) { // EoMPD - End of Media Presentation Description
                file_index++;
                if((!constant_num_segments_per_file)&&(num_segments_aligned))
                        byte(4) num_segments_in_one_file;
                for (i=0; i<num_separate_audio_alternatives; i++){
                        if(codec_mime_type_included_for_each_file)
                                string audio_codec_mime_type_for_one_file;
                        mpd_for_one_file( );
                file_index_a += num_segments_in_one_file;
                }
                for (i=0; i<num_separate_video_alternatives; i++) {
                        if(codec_mime_type_included_for_each_file)
                                string video_codec_mime_type_for_one_file;
                        mpd_for_one_file( );
                file_index_v += num_segments_in_one_file;
                }
                for (i=0; i<num_av_combined_alternatives; i++){
                        if(codec_mime_type_included_for_each_file){
                                string audio_codec_mime_type_for_one_file;
                                string video_codec_mime_type_for_one_file;
                        }
                        mpd_for_one_file( );
                file_index_av += num_segments_in_one_file;
                }
                for (i=0; i<num_video_fastfoward_alternatives; i++){
                        if((!file_index)||
                        (file_index%num_segments_denominator_ff[i]==1)){
                                if(codec_mime_type_included_for_each_file)
                                        string video_codec_mime_type_for_one_file;
                                mpd_for_one_file( );
                        file_index_ff += num_segments_in_one_file;
                        }
                }
                for (i=0; i<num_video_rewind_alternatives; i++){
                        if((!file_index)||
                        (file index%num_segments_denominator_ff[i]==1)){
                                if(codec_mime_type_included_for_each_file)
                                        string video_codec_mime_type_for_one_file;
                                mpd_for_one_file( );
                                file_index_rw += num_segments_in_one_file;
                        }
                }
        }
}
mpd_for_one_file( )
{
        if((!constant_num_segments_per_file)&&(!num_segments_aligned))
                byte(4) num_segments_in_one_file;
        for(i=0; i<num_segments_in_one_file; i++){
                if(!constant_segment_duration) {
                        byte(4) segment_start_time;
                        byte(4) segment_duration;
                }
                if(byte_offset_included) {
                        byte(4) segment_start_byte_offset;
                        byte(4) segment_end_byte_offset;
                }
        }
}
```

In an embodiment, the variables are defined as follows:

live_session: This field equal to FALSE indicates that the MPD is for an on-demand streaming session. The value TRUE indicates that the MPD is for a live streaming session.

major_brand: The major file brand identifier, indicating the file format features a client must support to be able to play the media presentation.

timescale: An integer that specifies the time-scale for the entire presentation; this is the number of time units that pass in one second. For example, a time coordinate system that measures time in sixtieths of a second has a time scale of 60.

presentation_duration: An integer that declares the length of the presentation (in the indicated timescale) of an alternative representation for normal playback. When the value is equal to 0, the length of the presentation is unknown. In a media presentation description for a live streaming session this value is set to 0.

constant_segment_duration: When the value is TRUE, segment length is constant in time. When the value is FALSE, segment length in time is not constant.

segment_duration: Gives the length of a segment in time (in the indicated timescale).

constant_num_segments_per_file: When the value is TRUE, except for the file(s) containing a 'moov' box, each file contains a constant number of segments. When the value is FALSE, files not containing a 'moov' box may contain different numbers of segments.

num_segments_in_one_file: Gives the number of segments (except for the file(s) containing a 'moov' box) in one file.

num_segments_aligned: When the value is TRUE, the number of segments in each file is temporally aligned for all alternative representations. When the value is FALSE, the number of segments in each file is not temporally aligned for all alternative representations.

byte_offset_included: When TRUE, byte offsets for each segment are included in the MPD. When FALSE, byte offsets for each segment are not included in the MPD.

codec_mime_type_included_for_each_file: When TRUE, a codec MIME type is included in file specific part of the MPD. When FALSE, codec MIME type information in included only in the global part of the MPD.

num_separate_audio_alternatives: Specifies the number of separately stored audio alternative representations.

num_separate_video_alternatives: Specifies the number of separately stored video alternative representations.

num_av_combined_audio_alternatives: Specifies the number of separately stored audio-video alternative representations.

num_video_fastforward_alternatives: Specifies the number of separately stored video fast forward alternative representations.

num_video_rewind_alternatives: Specifies the number of separately stored video fast rewind alternative representations.

codec_mime_type: Gives the MIME type parameter for the initial media samples of the audio or video media type in an alternative representation. For video, this MIME type parameter includes also the profile and level information.

avg_bitrate/audio_avg_bitrate/video_avg_bitrate: Gives the average bitrate of the audio or video media type in an alternative representation, in bits per second.

language_code: Declares the language code for this media. See ISO 639-2/T for the set of three character codes. Each character is packed as the difference between its ASCII value and 0x60. Since the code is confined to being three lower-case letters, these values are strictly positive.

channel_count: Gives the number of audio channels of the audio media type in an alternative representation.

url_prefix: Gives the URL prefix for an alternative representation. The URL of a file containing one or more segments of an alternative representation is the concatenation of the URL prefix for the alternative representation and the corresponding file index value, e.g. in the form of five decimal digits, e.g., 00000, 00005, 00012, and so on. The file index value is derived from the MPD. For each alternative representation, the file index value for the first file (the one containing a 'moov' box) is equal to 0, the file index value for other files is equal to the segment index value of the first segment contained in the file, which is equal to the sequence_number field found in the movie fragment header box of the movie fragment corresponding to the first segment contained in the file. When segment duration is constant and there are no byte offsets and no time offsets signaled for each segment in the MPD, a client can figure out which file to start with when it wants to seek to a specific temporal position.

max_segment_len_in_bytes: Specifies the maximum length of a segment in bytes. This value enables to use an appropriate byte range without signaling of all byte ranges in the MPD. For example, starting from the beginning of a segment, without knowing the length of the segment in bytes, the client may request a block of data of the size equal to max_segment_len_in_bytes to ensure that the entire segment is requested. Starting from a specific position of a segment, without knowing the length of the segment in bytes, the client may request a block of data of the size equal to max_segment_len_in_bytes minus the specific position in bytes of the segment to ensure that the entire segment is requested.

width: Specifies the horizontal resolution of the video media type in an alternative representation, counted in pixels.

height: Specifies the vertical resolution of the video media type in an alternative representation, counted in pixels.

avg_framerate: Specifies the average frame rate, in units of frames per 256 seconds, of the video media type in an alternative representation. For video fast forward or fast rewind alternative representations, this value is calculated as the number of all video frames divided by the length of the presentation (in the indicated timescale) of an alternative representation for normal playback then scaled to units of frames per 256 seconds.

num_segments_denominator_ff[i]: Each segment of the i-th video fast forward alternative representation corresponds to a number equal to num_segments_denominator_ff[i] of segments in a video alternative representation for normal playback.

num_segments_denominator_rw[i]: Each segment of the i-th video fast rewind alternative representation corresponds to a number equal to num_segments_denominator_rw[i] of segments in a video alternative representation for normal playback.

audio_codec_mime_type_for_one_file: Specifies the codec MIME type for the audio samples in a file corresponding to a specific file index value.

video_codec_mime_type_for_one_file: Specifies the codec MIME type for the video samples in a file corresponding to a specific file index value. This value includes profile and level information.

segment_start_time: Gives the starting time of a segment, in milliseconds, in relative to the beginning of the presentation.

segment_duration: Gives the duration of a segment, in the indicated timescale.

segment_start_byte_offset: Gives the byte offset of the first byte of the segment in the file containing the segment.

segment_end_byte_offset: Gives the byte offset of the last byte of the segment in the file containing the segment.

It should be appreciated that alternative embodiment may encompass a subset of the above commands, variables and definitions.

In an embodiment, the MPD may be described in XML, or described in SDP, or as a block data fields included in a new box according to the ISO base media file format. The MPD in the form of XML or SDP may also be included in a box, e.g. the 'moov' box, or a new box right after the 'ftyp' box in a file.

An example XML scheme that specifies the format of any MPD in XML is as follows.

```
<?xml version="1.0"?>
<xs:schema xmlns:xs="http://www.w3.org/2001/XMLSchema">
<xs:element name="media_presentation_description_for_http_streaming">
<xs:sequence>
<xs:element name="live_session" type="xs:boolean"/>
<xs:element name="major_brand" type="xs:unsignedLong"/>
<xs:element name="timescale" type="xs:unsignedLong"/>
<xs:element name="presentation_duration" type="xs:unsignedLong"/>
<xs:element name="constant_segment_duration" type="xs:boolean"/>
<xs:element name="segment_duration" type="xs:unsignedLong" minOccurs="0" maxOccurs="1">
 <xs:simpleType>
  <xs:restriction>
   <xs:assertion test="/constant_segment_duration[1]=true"/>
  </xs:restriction>
 </xs:simpleType>
</xs:element>
<xs:element name="constant_num_segments_perfile" type="xs:boolean"/>
<xs:element name="num_segments_in_one_file" type="xs:unsignedLong" minOccurs="0" maxOccurs="1">
 <xs:simpleType>
  <xs:restriction>
   <xs:assertion test="/constant_num_segments_per_file[1]=true"/>
  </xs:restriction>
 </xs:simpleType>
</xs:element>
<xs:element name="num_segments_aligned" type="xs:boolean"/>
<xs:element name="byte_offset_included" type="xs:boolean"/>
<xs:element name="codec_mime_type_included_for_each_file" type="xs:boolean"/>
<xs:element name="num_separate_audio_alternatives" type="xs:unsignedShort"/>
<xs:element name="num_separate_video_alternatives" type="xs:unsignedShort"/>
<xs:element name="num_av_combined_alternatives" type="xs:unsignedShort"/>
<xs:element name="num_video_fastfoward_alternatives" type="xs:unsignedShort"/>
<xs:element name="num_video_rewind_alternatives" type="xs:unsignedShort"/>
<xs:group minOccurs="/num_separate_audio_alternatives[1]"
maxOccurs="/num_separate_audio_alternatives[1]">
 <xs:sequence>
   <xs:element name="codec_mime_type" type="xs:string"/>
   <xs:element name="avg_bitrate" type ="xs:unsignedLong"/>
   <xs:element name="language_code" type ="xs:unsignedShort"/>
   <xs:element name="channel_count" type ="byte"/>
   <xs:element name="url_prefix" type="xs:string"/>
   <xs:element name="max_segment_len=in_bytes" type ="xs:unsignedLong"/>
 </xs:sequence>
</xs:group>
<xs:group minOccurs="/num_separate_video_alternatives[1]"
maxOccurs="/num_separate_video_alternatives[1]">
 <xs:sequence>
   <xs:element name="codec_mime_type" type="xs:string"/>
   <xs:element name="width" type ="xs:unsignedLong"/>
   <xs:element name="height" type ="xs:unsignedLong"/>
   <xs:element name="avg_framerate" type ="xs:unsignedLong"/>
   <xs:element name="avg_bitrate" type ="xs:unsignedLong"/>
   <xs:element name="url_prefix" type="xs:string"/>
   <xs:element name="max_segment_len_in_bytes" type ="xs:unsignedLong"/>
 </xs:sequence>
</xs:group>
<xs:group minOccurs="/num_av_combined_alternatives[1]"
maxOccurs="/num_av_combined_alternatives[1]">
 <xs:sequence>
   <xs:element name="audio_codec_mime_type" type="xs:string"/>
   <xs:element name="audio_avg_bitrate" type="xs:unsignedLong"/>
   <xs:element name="language_code" type="xs:unsignedShort"/>
   <xs:element name="channel_count" type="byte"/>
   <xs:element name="video_codec_mime_type" type="xs:string"/>
   <xs:element name="width" type="xs:unsignedLong"/>
   <xs:element name="height" type="xs:unsignedLong"/>
   <xs:element name="video_avg_framerate" type="xs:unsignedLong"/>
   <xs:element name="avg_bitrate" type ="xs:unsignedLong"/>
   <xs:element name="url_prefix" type="xs:string"/>
   <xs:element name="max_segment_len_in_bytes" type ="xs:unsignedLong"/>
 </xs:sequence>
</xs:group>
<xs:group minOccurs="/num_video_fastfoward_alternatives[1]" maxOccurs="/
num_video_fastfoward_alternatives[1]">
 <xs:sequence>
   <xs:element name="codec_mime_type" type="xs:string"/>
   <xs:element name="width" type="xs:unsignedLong"/>
   <xs:element name="height" type="xs:unsignedLong"/>
   <xs:element name="avg_framerate" type="xs:unsignedLong"/>
   <xs:element name="avg_bitrate" type="xs:unsignedLong"/>
   <xs:element name="url_prefix" type="xs:string"/>
   <xs:element name="max_segment_len_in_bytes" type ="xs:unsignedLong"/>
```

-continued

```
    <xs:element name="num_segments_denominator_ff" type ="xs:byte"/>
   </xs:sequence>
  </xs:group>
  <xs:group minOccurs="/num_video_rewind_alternatives[1]"
  maxOccurs="/num_video_rewind_alternatives[1]">
   <xs:sequence>
    <xs:element name="codec_mime_type" type="xs:string" />
    <xs:element name="width" type="xs:unsignedLong"/>
    <xs:element name="height" type="xs:unsignedLong"/>
    <xs:element name="avg_framerate" type="xs:unsignedLong" />
    <xs:element name="avg_bitrate" type="xs:unsignedLong" />
    <xs:element name="url_prefix" type="xs:string"/>
    <xs:element name="max_segment_len_in_bytes" type ="xs:unsignedLong"/>
    <xs:element name="num_segments_denominator_rw" type ="xs:byte"/>
   </xs:sequence>
  </xs:group>
  <xs:complexType name="mpd_for_one_file">
  <xs:sequence>
  <xs:element name="num_segments_in_one_file" type="xs:unsignedLong">
   <xs:simpleType>
    <xs:restriction>
     <xs:assertion test="/constant_num_segments_per_file[1]=false"/>
     <xs:assertion test="/num_segments_aligned[1]=false"/>
    </xs:restriction>
   </xs:simpleType>
  </xs:element>
  <xs:group minOccurs="/num_segments_in_one_file[1]" maxOccurs="/num_segments_in_one_file[1]">
  <xs:sequence>
   <xs:element name="segment_start_time" type="xs:unsignedLong">
    <xs:simpleType>
     <xs:restriction>
      <xs:assertion test="/constant_segment_duration=false"/>
     </xs:restriction>
    </xs:simpleType>
   </xs:element>
   <xs:element name="segment_duration" type="xs:unsignedLong">
    <xs:simpleType>
     <xs:restriction>
      <xs:assertion test="/constant_segment_duration=false"/>
     </xs:restriction>
    </xs:simpleType>
   </xs:element>
   <xs:element name="segment_start_byte_offset" type="xs:unsignedLong">
    <xs:simpleType>
     <xs:restriction>
      <xs:assertion test="/byte_offset_included[1]=true"/>
     </xs:restriction>
    </xs:simpleType>
   </xs:element>
   <xs:element name="segment_end_byte_offset" type="xs:unsignedLong">
    <xs:simpleType>
     <xs:restriction>
      <xs:assertion test="/byte_offset_included[1]=true"/>
     </xs:restriction>
    </xs:simpleType>
   </xs:element>
  </xs:sequence>
  </xs:group>
  </xs:sequence>
  </xs:complexType >
  <xs:group maxOccurs="unbounded">
   <xs:element name="num_segments_in_one_file" type="xs:unsignedLong">
    <xs:simpleType>
     <xs:restriction>
      <xs:assertion test="/constant_num_segments_per_file[1]=false"/>
      <xs:assertion test="/num_segments_aligned[1]=true"/>
     </xs:restriction>
    </xs:simpleType>
   </xs:element>
   <xs:group minOccurs="/num_separate_audio_alternatives[1]"
   maxOccurs="/num_separate_audio_alternatives[1]">
    <xs:sequence>
    <xs:element name="audio_codec_mime_type_for_one_file" type="xs:string">
     <xs:simpleType>
      <xs:restriction>
       <xs:assertion test="/codec_mime_type_included_for_each_file[1]=true"/>
      </xs:restriction>
     </xs:simpleType>
    </xs:element>
```

-continued

```
  <xs:element type="mpd_for_one_file"/>
 </xs:sequence>
</xs:group>
<xs:group minOccurs="/num_separate_video_alternatives[1]"
maxOccurs="/num_separate_video_alternatives[1]">
 <xs:sequence>
 <xs:element name="video_codec_mime_type_for_one_file" type="xs:string">
  <xs:simpleType>
   <xs:restriction>
    <xs:assertion test="/codec_mime_type_included_for_each_file[1]=true"/>
   </xs:restriction>
  </xs:simpleType>
 </xs:element>
 <xs:element type="mpd_for_one_file"/>
 </xs:sequence>
</xs:group>
<xs:group minOccurs="/num_av_combined_alternatives[1]"
maxOccurs="/num_av_combined_alternatives[1]">
 <xs:sequence>
 <xs:element name="audio_codec_mime_type_for_one_file" type="xs:string">
  <xs:simpleType>
   <xs:restriction>
    <xs:assertion test="/codec_mime_type_included_for_each_file[1]=true"/>
   </xs:restriction>
  </xs:simpleType>
 </xs:element>
 <xs:element name="video_codec_mime_type_for_one_file" type="xs:string">
  <xs:simpleType>
   <xs:restriction>
    <xs:assertion test="/codec_mime_type_included_for_each_file[1]=true"/>
   </xs:restriction>
  </xs:simpleType>
 </xs:element>
 <xs:element type="mpd_for_one_file"/>
 </xs:sequence>
</xs:group>
<xs:group minOccurs="/num_video_fastfoward_alternatives[1]"
maxOccurs="/num_video_fastfoward_alternatives[1]">
 <xs:sequence>
 <xs:element name="video_codec_mime_type_for_one_file" type="xs:string">
  <xs:simpleType>
   <xs:restriction>
    <xs:assertion test="/codec_mime_type_included_for_each_file[1]=true"/>
   </xs:restriction>
  </xs:simpleType>
 </xs:element>
 <xs:element type="mpd_for_one_file"/>
 </xs:sequence>
</xs:group>
<xs:group minOccurs="/num_video_rewind_alternatives[1]"
maxOccurs="/num_video_rewind_alternatives[1]">
 <xs:sequence>
 <xs:element name="video_codec_mime_type_for_one_file" type="xs:string">
  <xs:simpleType>
   <xs:restriction>
    <xs:assertion test="/codec_mime_type_included_for_each_file[1]=true"/>
   </xs:restriction>
  </xs:simpleType>
 </xs:element>
 <xs:element type="mpd_for_one_file"/>
 </xs:sequence>
</xs:group>
 </xs:group>
 </xs:sequence>
</xs:element>
</xs:schema>
```

The above embodiment syntax and semantics for the MPD applies to storage approach 1 for some embodiments. When storage approach 2 is in use, the MPD may be slightly modified in some embodiments as follows. For example, the MPD can be included in the "giant" 'moov' box or referenced by a URL in the "giant" 'moov' box. Fields for which the equivalent information can be found from the "giant" 'moov' box, e.g., major_brand, timescale, and presentation_duration, may be excluded from the MPD. The file index values are then initially set to equal to 1, instead of 0, such that in the loop after the global information the index value starts from 1, and the file index value 0 is reserved for the file containing the "giant" 'moov' box.

In an embodiment, the URL prefix is added as part of the global information for the file containing the "giant" 'moov' box, and the URL for the file is the concatenation of the URL prefix and "00000". Alternatively, the URL of the file itself is added as part of the global information.

For signaling of codec information in the MPD, an alternative way is to signal one global codec MIME type for one alternative representation of one media type, and specify that the global codec_mine_type only indicates the initial codec MIME type of the media type in the alternative representation. Similar approaches can be applied for streaming of multimedia contents containing other media types such timed text and timed graphics.

In some embodiment, an on-demand streaming process is implemented that enables a setup, pause, resume and stop feature. In an embodiment, a streaming setup includes the following steps. First the client gets the URL of the MPD. How the client gets the URL of the MPD is out of the scope of this document. Second the client gets the MPD, e.g. using an HTTP GET request. It is also possible that the client gets the MPD in a progressive manner, i.e., using multiple HTTP GET requests with byte ranges. When progressive requesting of MPD is in use, the following steps can already start as soon as the MPD data for the respective segments are available at the client, and the client may use a separate TCP link for requesting MPD while using TCP links for requesting segments. When the storage approach 2 is in use, the client gets the file containing the "giant" 'moov' box and, if the MPD is not included, the MPD, using one HTTP GET request or in a progressive manner;

Third, the client parses the MPD and chooses one or more appropriate alternative representations (one for each media type) containing all the media types the client wants. When the storage approach 2 is in use, the client may parse the file containing the "giant" 'moov' box and use the information therein, in addition to or including the MPD, in choosing appropriate alternative representations.

Fourth, the client requests the segments of the chosen alternative representations, starting from the first segment for each chosen alternative representation. When the storage approach 2 is in use, the client requests the segments of the chosen alternative representations, starting from the second segment for each chosen alternative representation.

In an embodiment, the URL of the file containing a specific segment is indicated by the MPD, wherein each file index value corresponds to one file and a number of segments, and the URL for one file index value is the concatenation of the corresponding URL prefix and the file index value, e.g. in the form of 5 decimal digits. This rule applies to all HTTP GET requests involved in the streaming process, including the live streaming case. When the storage approach 2 is in use, the file index value 00000 is reserved for the file containing the "giant" 'moov' box.

If an entire file, regardless of whether it contains one or more segments, is requested, then use of byte range is not needed. If more than one segment is stored in a file, and the client requests a subset of all segments included in the file, byte range must be used. This rule applies to all HTTP GET requests involved in the streaming process, including the live streaming case.

In an embodiment, to pause or stop, the client simply stops requesting more data by sending HTTP GET requests. To resume, the client sends HTTP GET requests to request segments, starting from the next segment after the last requested segment.

In an embodiment, to seek to a specific position, forward or backward, the client sends HTTP GET requests to request segments of the current alternative representations, starting from the segment starting from the specific position. Note that seeking can only target at specific positions where segment starts. For seeking to a specific backward position, if the client has buffered the data since that specific position, it can playback the buffer data since that specific position.

In an embodiment, to perform fast forward at a specific playback speed, the following steps are performed. First, the client stops requesting data of the current alternative representations. Second the client chooses an appropriate video fast forward alternative representation that has the closest frame rate corresponding to the target playback speed. Third, the client requests segments of the chosen alternative representation, starting from the temporal position right after the last requested segment. In one embodiment, the client plays the media at the specified playback speed.

In an embodiment, to perform fast rewind at a specific playback speed, the following steps are performed. First, the client stops requesting data of the current alternative representations. Second, the client chooses an appropriate video fast rewind alternative representation that has the closest frame rate corresponding to the target playback speed. Third, the client requests segments of the chosen alternative representation, starting from the temporal position right after the last requested segment. In one embodiment, this requires that in the creation of the video fast rewind alternatives, the decoding order of the video frames are in reverse of the display order. In an embodiment, the client plays the media at the specified playback speed.

In an embodiment, to perform streaming adaptation by switching from one alternative representation A to another alternative representation B, the following steps are performed. First, the client stops requesting data of the current alternative representations.

Second, if the client has never received any segment of B, then the client firstly requests the first segment of B, and then requests the segments of B starting from the temporal position right after the last requested segment. At the same time the client stores the first segment of B for future use when switching back to B from any other alternative representation. If the client has received and stored the first segment of B, then requesting of the first segment is skipped. When the storage approach 2 is in use, the client simply requests the segments of B starting from the temporal position right after the last requested segment.

In an embodiment, for live streaming, the following restrictions apply in some embodiments. First, except for the first segment, which contains zero media samples, segment duration in the temporal dimension is constant, i.e., constant_segment_duration is not equal to 0.

Second, if each segment is stored in a separate file, then the MPD does not contain elements for each file, i.e., the MPD is static (not changing) during the live streaming session. This implies that constant_num_segments_per_file is not equal to 0, codec_mime_type_included_for_each_file shall be equal to 0, constant_segment_duration is not be equal to 0, and byte_offset_included is equal to 0. In this case, the URL of the file containing the last segment for each alternative representation shall be the concatenation of the URL prefix for the alternative representation and the 5 decimal digits value 99999. Alternatively, the URL the file containing the last segment for each alternative representation can be the concatenation of the URL prefix for the alternative representation and a special string, e.g. "last_segment". In an embodiment, if a file contains more than one segment, then num_segments_aligned is set true.

In one live streaming embodiment, setup has the following steps. First, the client gets the URL of the MPD. Second, the client gets the MPD using an HTTP GET request. When the storage approach 2 is in use, the client gets the file containing the "giant" 'moov' box and, if the MPD is not included, the MPD.

Third, the client parses the MPD and chooses one or more appropriate alternative representations (one for each media type) containing all the media types the client wants. When the storage approach 2 is in use, the client may parse the file containing the "giant" 'moov' box and use the information therein, in addition to or including the MPD, in choosing appropriate alternative representations.

Fourth, the client requests the first segment for each of the chosen alternative representations, and then requests the last segment for each chosen alternative representation. When the storage approach 2 is in use, the client directly requests the last segment for each chosen alternative representation.

Fifth, if each segment is stored in a separate file (i.e. constant_num_segments_per_file is equal to 1), the client periodically checks the availability of the next file corresponding to the next file index value, and when the file is available, the client requests the next file using an HTTP GET request without byte range. In this case, if the next file does not contain a 'moof' box (e.g., the file is empty), then the client shall conclude that the live stream session has ended. Otherwise (more than one segment may be stored in a file), the client periodically requests the updated part of the MPD, by using an HTTP GET request with an open-ended byte range starting after the last byte previously requested, and then requests the next available segment. In this case, if the next segment is empty (i.e. it contains no media samples), the client shall conclude that the live stream session has ended. The client may use a separate TCP link for requesting MPD while using another TCP link for requesting segments. The period for periodically checking of the availability of the next file or the next segment should be less than but close to the segment duration or equal to the segment duration.

In an embodiment, to pause or stop, the client simply stops requesting more data by sending HTTP GET requests. To resume, the client sends an HTTP GET request to request the last segment for each chosen alternative representation, and then performs the fifth step above.

In an embodiment, to seek to a specific backward position, the client sends HTTP GET requests to request segments of the current alternative representations, starting from the segment starting from the specific position. In some embodiments, seeking targets at specific positions where segment starts. If the client has buffered the data since that specific position, it can playback the buffer data since that specific position.

In one embodiment, fast rewind for live streaming is the same as for on-demand streaming.

In a live streaming embodiment, to perform streaming adaptation by switching from one alternative representation A to another alternative representation B, the following steps are performed.

First, the client stops requesting data of the current alternative representations. Second, if the client has never received any segment of B, then the client firstly requests the first segment of B, and then requests the last segment of B. At the same time the client should store the first segment of B for future use when switching back to B from any other alternative representation. If the client has received and stored the first segment of B, then requesting of the first segment is skipped. When the storage approach 2 is in use, the client simply requests the last segment of B.

Third, if each segment is stored in a separate file (i.e. constant_num_segments_per_file is equal to 1), the client periodically checks the availability of the next file corresponding to the next file index value, and when the file is available, the client requests the next file using an HTTP GET request without byte range. In this case, if the next file does not contain a 'moof' box (e.g., the file is empty), then the client shall conclude that the live stream session has ended. Otherwise (more than one segment may be stored in a file), the client periodically requests the updated part of the MPD, by using an HTTP GET request with an open-ended byte range starting after the last byte previously requested, and then requests the next available segment. In this case, if the next segment is empty (i.e. it contains no media samples), the client shall conclude that the live stream session has ended. The client may use a separate TCP link for requesting MPD while using another TCP link for requesting segments. The period for periodically checking of the availability of the next file or the next segment should be less than but close to the segment duration or equal to the segment duration.

In an embodiment, in the MPD, the byte range and time range of a media segment may be included, such that clients can efficiently request media segments using byte ranges only.

In a further embodiment, the MPD may include additional codec information for a media alternative representation for support of media contents encoded with more than one encoding configuration. In an embodiment, the maximum length of all segments can be included in the MPD to enable use of byte range without signaling of byte ranges in the MPD and a greatly reduced size of MPD, which implies low startup delay for the streaming process.

In a further embodiment, to indicate the end of a live streaming session, the server can compose the next expected file or segment in an abnormal way, e.g. making the file or segment empty. In an embodiment, to enable tuning into a live streaming session and start to request the latest content, a special file name and consequently a special URL is used for the file containing the latest segment available in the streaming server. In an embodiment, to enable a client figure out which file to start with when it wants to seek to a specific temporal position while segment duration is constant and there are no byte offsets and no time offsets signaled for each segment in the MPD, the URL of a file is formed to be capable of indicating the starting playback time of the file. In one embodiment, efficient streaming processes that enable normal streaming processes like setup, pause, resume, and stop, as well as seeking, fast forward, fast rewind and stream adaption processes are provided.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

electronically receiving, by a Hypertext Transfer Protocol (HTTP) streaming client, a media presentation description (MPD) element describing a media presentation, wherein the media presentation includes a plurality of alternative representations each of which comprising segments corresponding to an alternative encoding choice of a media content, and wherein the MPD element includes metadata for accessing segments in the plurality of alternative representations; and constructing, by the HTTP streaming client, at least a first uniform resource locator (URL) for accessing a first segment of a first one of the plurality of alternative representations, wherein the first URL is constructed in accordance with the metadata in the MPD element without relying on proprietary extensions excluded from the Hypertext Transfer Protocol (HTTP) 1.1 protocol (HTTP/1.1 protocol).

2. The method of claim 1, wherein the MPD element is an extensible markup language (XML) document.

3. The method of claim 1, wherein the MPD element includes a media presentation duration attribute specifying a duration of the media presentation.

4. The method of claim 1, wherein the MPD element includes a width attribute specifying a horizontal visual presentation size of a video media type in the first alternative representation.

5. The method of claim 1, wherein the MPD element includes a height attribute specifying a horizontal visual presentation size of a video media type in the first alternative representation.

6. The method of claim 1, wherein the MPD element includes a frame rate attribute specifying a frame rate of a video media type in the first alternative representation.

7. The method of claim 1, wherein the MPD element includes a language attribute specifying one or more language codes associated with the first alternative representation.

8. The method of claim 1, wherein the MPD element includes a

Multipurpose Internet Mail Extensions (MIME) type attribute specifying a MIME type associated with the first segment.

9. The method of claim 1, wherein the MPD element includes a codec attribute specifying media types included within the first alternative representation.

10. The method of claim 1, wherein the MPD element includes a byte range attribute specifying a byte range of the first segment.

11. The method of claim 1, wherein the MPD element includes a playout rate attribute specifying whether the first alternative representation is adapted for efficient fast-forward or rewind.

12. The method of claim 1, further comprising:

sending, by the HTTP streaming client, an HTTP GET request carrying the first URL to an HTTP server to request the first segment.

13. The method of claim 1, wherein constructing at least a first URL comprises:

constructing a set of URLs corresponding to a set of segments in the first representation.

14. The method of claim 13, further comprising:

sending, by the HTTP streaming client, a series of HTTP GET requests to an HTTP server to request the set of segments, wherein each HTTP GET request in the series of HTTP GET requests carries a different URL in the set of URLs.

15. A method comprising:

assembling, by a Hypertext Transfer Protocol (HTTP) server, a media presentation description (MPD) element describing a media presentation, wherein the media presentation includes a plurality of alternative representations each of which comprising segments corresponding to an alternative encoding choice of a media content, and wherein the MPD element includes metadata for accessing segments in the plurality of alternative representations; and sending, by the HTTP server, the MPD element to an HTTP streaming client, wherein the metadata of the MPD element is configured to be used to construct uniform resource locators (URLs) of individual segments in the alternative representations without relying on proprietary extensions excluded from the Hypertext Transfer Protocol (HTTP) 1.1 protocol (HTTP/1.1 protocol).

16. The method of claim 15, wherein the MPD element includes a media presentation duration attribute specifying a duration of the media presentation.

17. The method of claim 15, wherein the MPD element includes a width attribute specifying a horizontal visual presentation size of a video media type in at least a first one of the alternative representations, a height attribute specifying a horizontal visual presentation size of the video media type in the first alternative representation, and a frame rate attribute specifying a frame rate of a video media type in the first alternative representation.

18. An apparatus comprising:

a processor; and a non-transitory computer readable medium storing programming for execution by the processor, the programming including instructions to:

communicate a media presentation description (MPD) element describing a multimedia content stored in an Hypertext Transfer Protocol (HTTP) sever, the multimedia content comprising alternative representations of a plurality of media types, wherein the MPD element includes information indicative of how an alternative representation is encoded, and wherein the MPD element includes metadata for accessing individual segments in the plurality of alternative representations, the metadata configured to be used for constructing uniform resource locators (URLs) of individual segments in the alternative representations without relying on proprietary extensions excluded from the Hypertext Transfer Protocol (HTTP) 1.1 protocol (HTTP/1.1 protocol).

19. The apparatus of claim 18, wherein the apparatus comprises the HTTP server.

20. The apparatus of claim 18, wherein the apparatus comprises the HTTP streaming client.

* * * * *